US011048759B1

(12) United States Patent
Pope et al.

(10) Patent No.: US 11,048,759 B1
(45) Date of Patent: Jun. 29, 2021

(54) TOCHENIZED CACHE

(71) Applicant: Prodigo Solutions Inc., Cranberry Township, PA (US)

(72) Inventors: Dermot Pope, Gibsonia, PA (US); Aaron Manuel, Cranberry Township, PA (US)

(73) Assignee: Prodigo Solutions Inc., Cranberry Township, OH (US)

( * ) Notice: Subject to any disclaimer, the term of this patent is extended or adjusted under 35 U.S.C. 154(b) by 548 days.

(21) Appl. No.: 15/934,019

(22) Filed: Mar. 23, 2018

Related U.S. Application Data

(60) Provisional application No. 62/477,181, filed on Mar. 27, 2017.

(51) Int. Cl.
| | |
|---|---|
| *G06F 16/903* | (2019.01) |
| *G06F 17/18* | (2006.01) |
| *G06F 12/0875* | (2016.01) |
| *G06F 40/216* | (2020.01) |

(52) U.S. Cl.
CPC .... *G06F 16/90344* (2019.01); *G06F 12/0875* (2013.01); *G06F 17/18* (2013.01); *G06F 40/216* (2020.01); *G06F 2212/45* (2013.01)

(58) Field of Classification Search
CPC ...................................................... G06F 16/313
USPC .................................................. 707/711, 712
See application file for complete search history.

(56) References Cited

U.S. PATENT DOCUMENTS

| | | | | |
|---|---|---|---|---|
| 8,065,286 B2* | 11/2011 | Jones | ................ | G06F 16/24578 707/706 |
| 10,552,462 B1* | 2/2020 | Hart | ....................... | G06F 16/907 |
| 2014/0297267 A1* | 10/2014 | Spencer | ................ | G06F 40/274 704/9 |
| 2015/0347423 A1* | 12/2015 | Jheeta | ................ | G06F 16/90324 707/767 |
| 2016/0162466 A1* | 6/2016 | Munro | ..................... | G06F 40/30 704/9 |

* cited by examiner

*Primary Examiner* — Baoquoc N To
(74) *Attorney, Agent, or Firm* — Calfee, Halter & Griswold LLP

(57) ABSTRACT

Methods of and systems for searching a catalog include parsing the items of the catalog into tokens, determining the frequency with which each token appears in the catalog, and storing the frequencies in a cache. Queries to the catalog are likewise parsed into tokens, and the tokens of the query string are compared to frequency values in the cache to identify a smaller search space within the catalog.

19 Claims, 5 Drawing Sheets

| Entry | Tokens |
|---|---|
| ASSASSIN | AS, IN, SA, SI, SS |
| SAINT | AI, IN, NT, SA |
| STAIN | AI, IN, ST, TA |
| SATIN | AT, IN, SA, TI |
| INSTANT | AN, IN, NS, NT, ST, TA |
| SATANIST | AN, AT, IS, NI, SA, ST, TA |
| TAINT | AI, IN, NT, TA |
| STATS | AT, ST, TA, TS |
| INSIST | IN, IS, NS, SI, ST |

| AA | AI | AN | AS | AT |
|---|---|---|---|---|
| 0 | 3 | 2 | 1 | 3 |
| IA | II | IN | IS | IT |
| 0 | 0 | 7 | 2 | 0 |
| NA | NI | NN | NS | NT |
| 0 | 1 | 0 | 2 | 3 |
| SA | SI | SN | SS | ST |
| 4 | 2 | 0 | 1 | 5 |
| TA | TI | TN | TS | TT |
| 5 | 1 | 0 | 1 | 0 |

TOCHENIZED CACHE

CROSS REFERENCE TO RELATED APPLICATIONS

This application claims priority to, and the benefits of, U.S. Provisional Application Ser. No. 62/477,181 filed on Mar. 27, 2017, which is incorporated by reference herein in full.

FIELD

The general inventive concepts relate to searching a catalog of data and, more particularly, to a method of and a system for using a tokenized cache to limit the search space.

BACKGROUND

With the proliferation of data warehousing, the ability to quickly search a large set of data is more important than ever. Whether searching the Internet or a large database of medical or business records or products, modern necessities demand fast results. When databases can house on the order of millions to even billions of records, such searches can become a cumbersome process and resource intensive. Current computer-based search methods are often too slow and resource intensive for applications that require fast or immediate querying of large, electronic, dynamic data warehouses, such as product procurement systems as described in U.S. Provisional Patent Application Ser. No. 62/431,611 entitled "Systems and Methods for Ranking Search Results Based on Item Price Incentive Data" ("The '611 Application"), the entire disclosure of which is incorporated herein by reference.

For example, typical search algorithms, such as the commonly used Boyer-Moore algorithm, can decrease search times significantly, but still are not efficient enough for the extra-large scale indexes and data sets that are becoming common place in modern business. Accordingly, there is a need for a system and method that can accurately limit the target search space of these large electronic data warehouses so as to reduce the time and resources necessary to search through large amounts of data.

SUMMARY

According to an embodiment, a computer-implemented method of searching a catalog of textual items includes parsing each textual item of the catalog to determine a set of tokens, wherein a token is a consecutive set of characters having a predetermined length. Each of the tokens is stored in a memory cache and, for each token, a frequency value indicative of the frequency with which that token appears in the catalog is stored. A textual search query is received and the textual query is parsed into tokens. An optimal search token is selected from the textual query based on the frequency value of that token in the memory cache. A subset of the catalog is searched for contents of the textual search query, wherein the subset of the catalog is a set of items that include the optimal search token. A search result is provided.

According to another embodiment, a system for searching a catalog of data items stored on a non-transitory computer readable medium is described, wherein the data items each comprise text characters divisible into a plurality of first tokens, each first token being a set of consecutive characters of a predetermined length within the data item. The system includes a memory cache having a matrix storing each of the plurality of first tokens of the catalog and a frequency value indicative of the frequency with which that first token appears in the catalog. Searches of the catalog are limited to a subset of the data items based on the frequency values stored in the memory cache.

Numerous other aspects, advantages, and/or features of the general inventive concepts will become more readily apparent from the following detailed description of exemplary embodiments, from the claims, and from the accompanying drawings being submitted herewith.

BRIEF DESCRIPTION OF THE DRAWINGS

The general inventive concepts, as well as embodiments and advantages thereof, are described below in greater detail, by way of example, with reference to the drawings in which:

FIG. 5A is an exemplary catalog of items in a database; and

FIG. 5B is an exemplary token matrix created from the exemplary catalog of FIG. 5A according the disclosed system and method.

DETAILED DESCRIPTION

Figure 1:
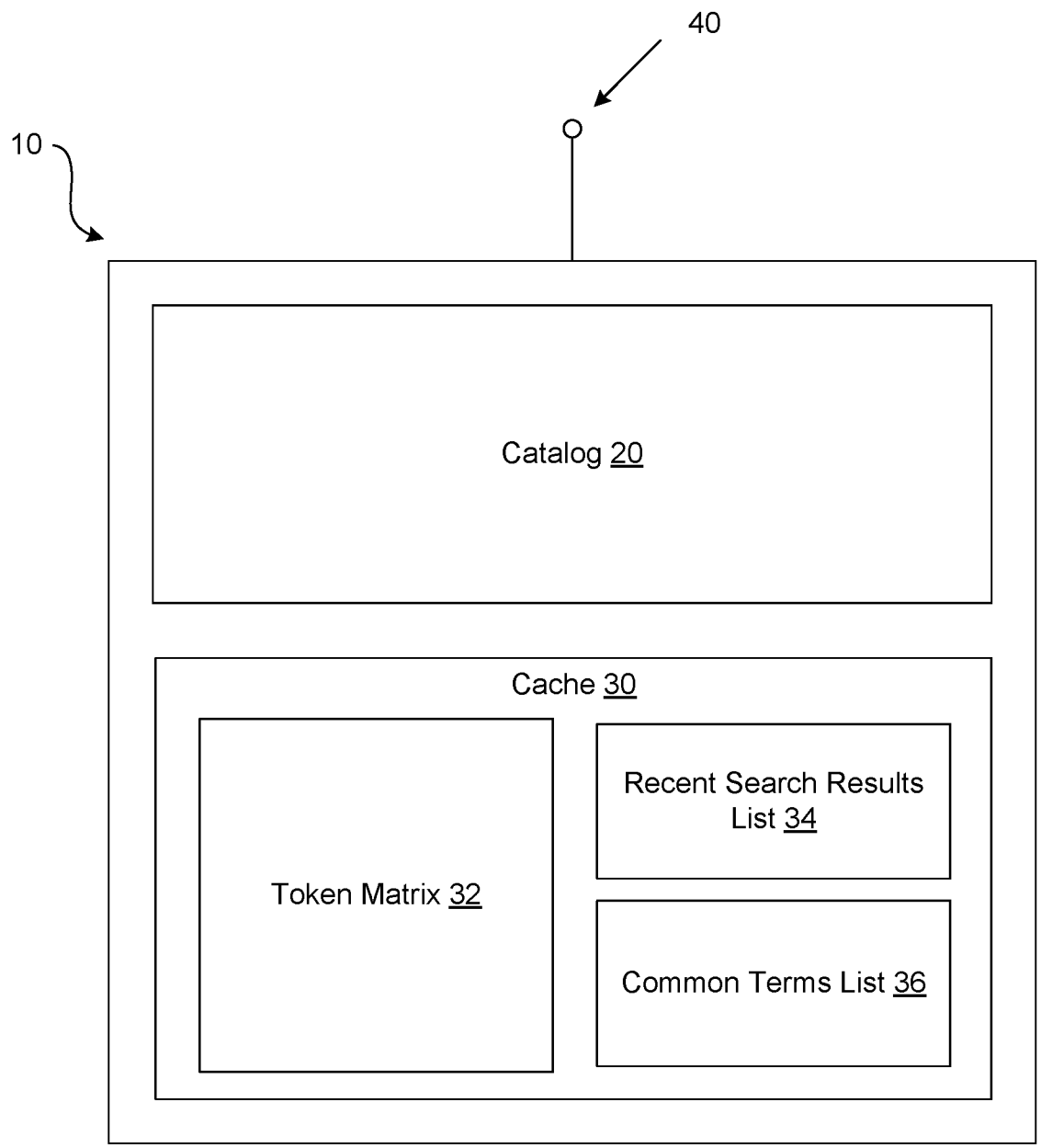
FIG. 1 is a schematic view of an exemplary system for searching a catalog using a tokenized cache.

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

The general inventive concepts encompass methods of and systems for using a tokenized cache to limit the search space when searching a large catalog of data. The methods and systems allow for more efficient (e.g., faster) searching of large databases and can be used regardless of language (or even for non-lingual data such as part numbers). As should be evident to one of ordinary skill in the art, the inventive concepts herein are thus necessarily rooted in computer technology and serve to improve the function of large-scale electronic data networks.

The terms "memory" and "memories" as used herein mean any computer-usable or computer-readable storage medium, including volatile and non-volatile, removable and non-removable media, such as, but not limited to, RAM, ROM, EEPROM, flash memory, optical storage such as CD and DVD, magnetic tapes, or any other such device capable of storing data that can be accessed by set of executable instructions on a computer system, whether known now or developed in the future.

FIG. 1 illustrates an exemplary schematic diagram of a system 10 including a catalog of data 20 and components for accessing and searching the catalog 20. The catalog of data 20 houses a set of text-based data items, for example, but not limited to, product names, product numbers, stock keeping units (SKUs), personally identifiable information, medical or business records, text indexes, or any other text-based data. The data may be housed in any suitable manner, for example, in a typical database or a flat file stored in a memory or set of memories, and may be housed across multiple machines and in multiple locations (e.g., cloud storage).

The system 10 further includes a cache 30. Generally, as discussed more fully below, the cache 30 is considered a "warm" cache, meaning the data in the cache is updated at a sufficient rate as to avoid stale data (with relation to the data in the catalog 20). The cache 30 may be stored in any suitable memory as described above and, while FIG. 1 depicts the components in a single system, it is contemplated that the cache 30 may be stored in a different location from the data in the catalog 20. For example, the cache 30 may reside at a client location for faster access, while the catalog 20 is stored in a remote data warehouse. In some embodiments, different components of the cache 30 may also reside in different locations.

The cache 30 may include several components, each of which are described below in greater detail. For example, the cache 30 includes a token matrix 32 that stores the set of tokens found in the catalog 20 and the frequency with which each token occurs in the catalog 20. In some embodiments, the cache 30 also includes a recent search results list 34 that stores the results of recent search queries. In some embodiments, the cache 30 includes a common terms list 36 that stores a list of common terms in the catalog 20 and the best search space for use with each term, as explained below.

The system 10 also includes input/output mechanisms 40. The input/output mechanisms 40 are used, inter alia, to submit queries to the system, to return query results, to add and/or remove data items to and from the catalog 20, or to otherwise update aspects of the cache 30. The input/output mechanisms 40 may be, for example, an Application Programming Interface (API) or any other suitable hardware and/or software mechanism for reading and editing data in the system 10, and may include multiple, different mechanisms for different functions (e.g., one for queries and one for editing the catalog, etc.). As with the cache 30, the input/output mechanisms 40 may be remote from the catalog 20 and/or cache 30 or maybe housed on the same internal network or on the same physical machine.

Figure 2:
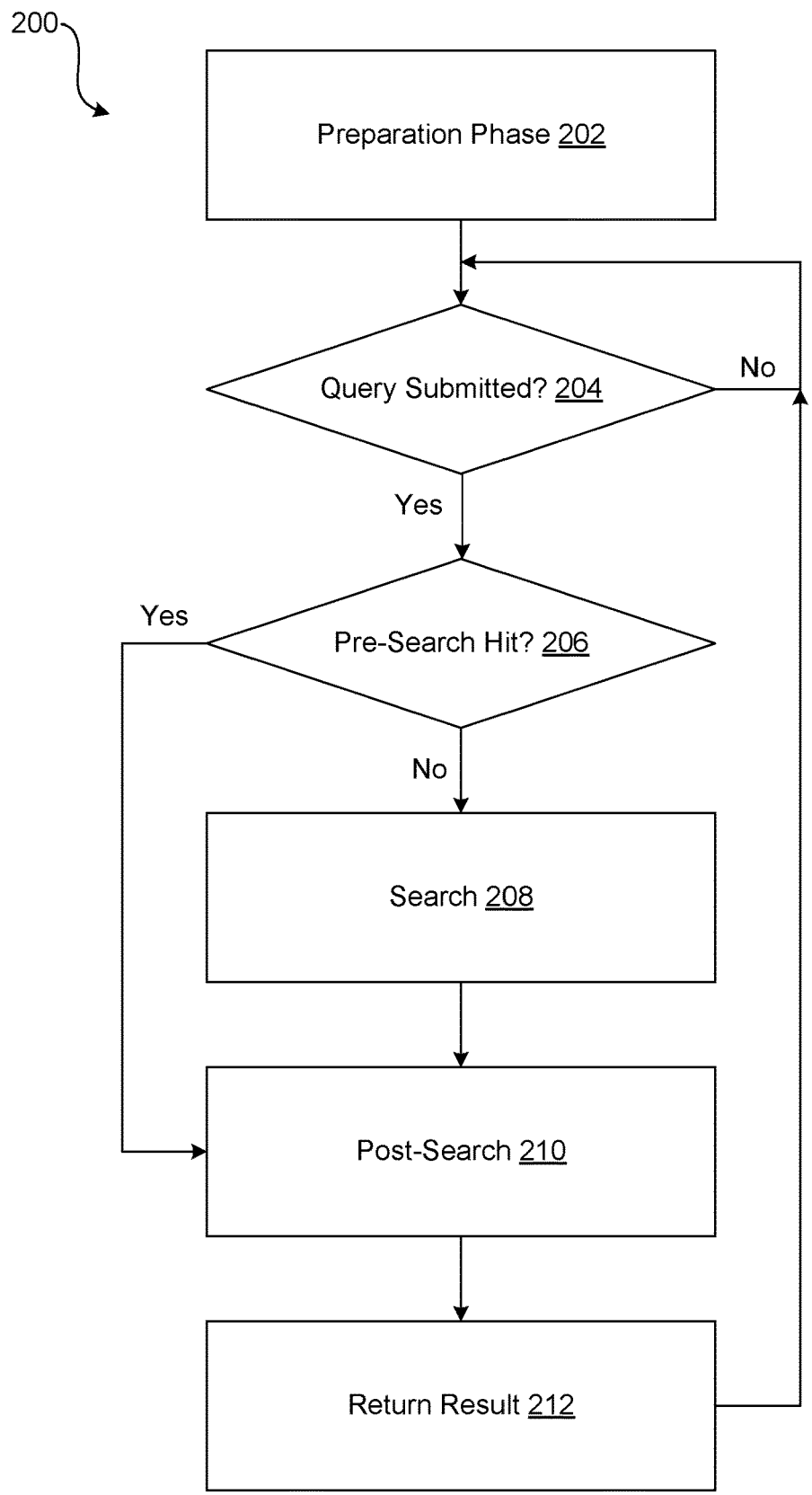
FIG. 2 is a flow diagram for an exemplary method for searching a catalog using a tokenized cache.

In general, as depicted in FIG. 2, a search method 200 utilizing the above-described structure includes several phases. An overview of the phases follows, with each phase described in detail thereafter. In preparation phase 202, the catalog is parsed and certain data created and stored in order to facilitate the later steps of the method 200. At step 204, a search query is submitted to the system. At step 206, the system enters a pre-search phase and utilizes data created at step 202 and later steps to either obtain a result without searching the catalog or to limit the search space for the next phase. At step 208, if the pre-search 206 did not obtain a result, a full search is performed on a more-limited search space obtained from step 206. At step 210, the system enters a post-search phase where the search result is analyzed and stored for use in future searches. At step 212, the system returns a search result.

In the preparation phase 202, the entire catalog (or at least a portion of the catalog of interest) is parsed and divided into smaller search spaces wherein each search space corresponds to an individual token contained in an item of the catalog. In an exemplary embodiment, the tokens are bigrams, i.e., consecutive two-letter combinations appearing within an item. It is contemplated that the tokens may be larger, for example, trigrams, i.e., consecutive three-letter tokens, or any n-gram. For purposes of this disclosure, unless otherwise stated for a specific exemplary embodiment, tokens will be said to have a length N.

Figure 3:
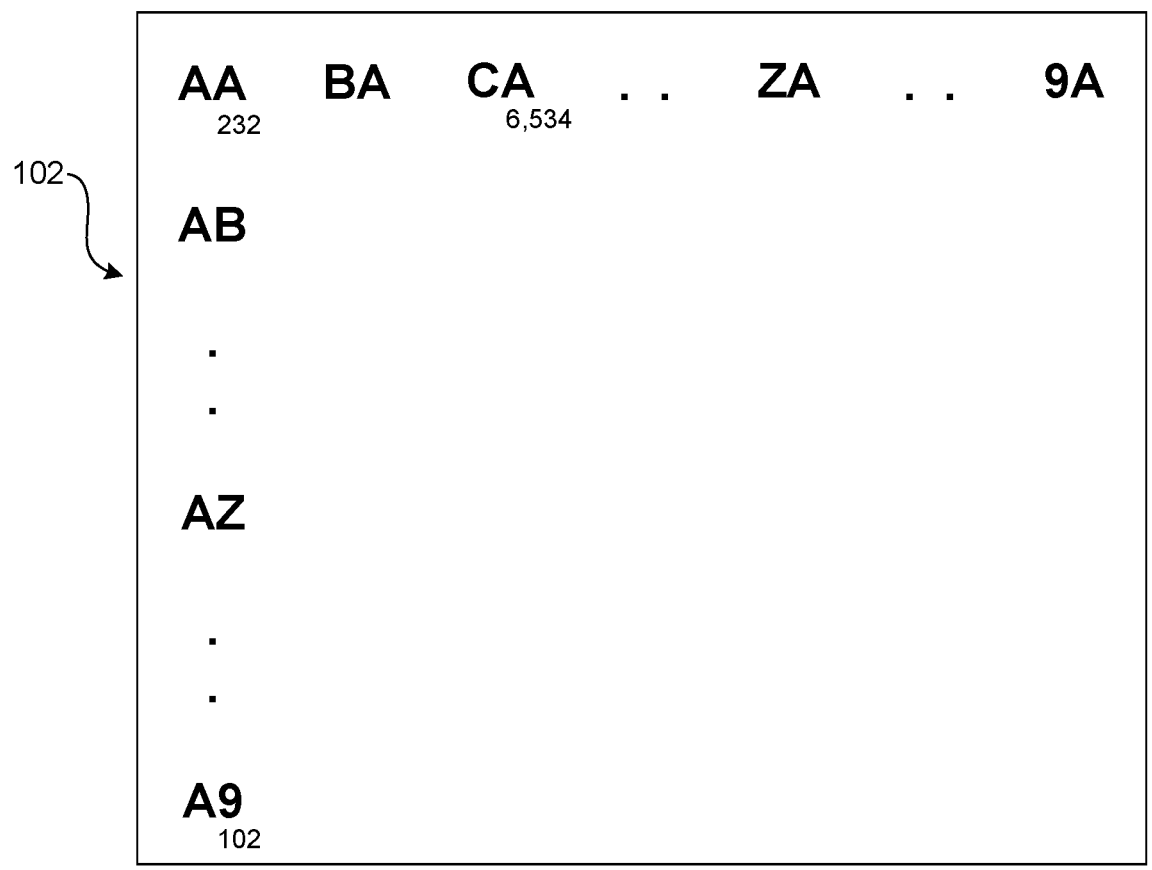
FIG. 3 is diagram of an exemplary token matrix for use in searching a catalog using a tokenized cache.
Figure 4:
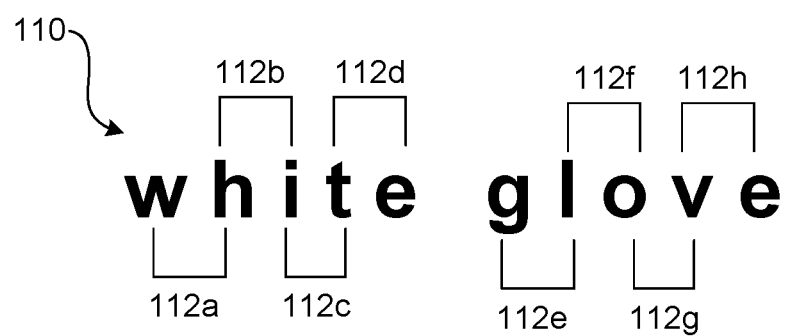
FIG. 4 is diagram of an exemplary query string parsed into exemplary tokens according to the disclosed system and method.

A token matrix is created and stored in the cache to hold the set and frequency of all tokens in the catalog. The token matrix is generally a matrix of N dimensions, for example, a two-dimensional matrix for bigrams, with one entry for each possible token in the catalog. FIG. 3 shows a representation of an exemplary token matrix 102 for a set of bigrams for a catalog. It may be advantageous to limit the set of possible tokens by not including certain non-standard characters, for example, periods, spaces, hyphens, parentheses, apostrophes, symbols, etc. It is also contemplated that spaces or other characters may be used as a break between tokens such that a space or other character is not included as part of a token, and such that the previous and subsequent letters do not form a token with the break. For example, FIG. 4 depicts an exemplary item 110 in the catalog, the text string "white glove," broken into constituent tokens 112a-112h, where the tokens are bigrams. In the exemplary item 110, the space between "white" and "glove" acts as a break, so there are no tokens that include the space character.

It may also be advantageous to ignore capitalization of letters, so as to treat uppercase and lowercase letters as the same character. In the exemplary token matrix of FIG. 3, for example, the character set is limited to the letters A-Z (without regard to capitalization) and numerals 0-9, for a total of 36 unique characters. This character set results in a fixed maximum token set of $36^2$ or 1,296 tokens. It should be appreciated that using larger tokens will result in an exponentially larger possible token set. For example, using trigrams with same character set would result in a maximum possible token set of $36^3$ or 46,656 tokens and a token matrix with as many possible entries.

As each item in the catalog is parsed, when a token is read, a frequency value in the token matrix associated with the token is incremented. For example, while parsing the item 110, when the first token 112a, is read, the frequency value for the token "wh" in the token matrix is incremented by 1. When the second token 112b is read, the frequency value for the token "hi" in the token matrix is incremented by 1, and so on. It is contemplated, but not required, that multiple instances of a token within a single item only affect the frequency value once for that token.

In order to facilitate the restriction of the search to a particular search space, each token in the token matrix may further have an associated key. The key may be stored in the token matrix with each token, or may be a function of the token itself, for example a numerical value corresponding to a bigram. The key may further be a hash or some other value capable of associating an item in the catalog with a particular token. Each item in the catalog would thus have a set of associated keys corresponding to each token found within that item. Accordingly, while parsing item 110 for example, when the first token 112a, is read, the key relating to the token "wh" in the token matrix is appended to or otherwise associated with the item 110. When the second token 112b is read, the frequency value for the token "hi" in the token matrix is appended to or otherwise associated with the item 110, and so on.

In sum, at completion of the preparation phase 202, the cache includes a token matrix with at least an entry for each token in the catalog and the frequency with which each token appears in the catalog. Each item in the catalog has a set of keys that relate that item to each of its constituent tokens in the cache.

There are also contemplated several additional steps in the preparation phase 202 to increase search functionality during later steps. For example, in one embodiment, the cache further holds a list of commonly used terms in the industry and an associated best token (as described below) for those terms. Such a list can be manually pre-programmed, or can be created by parsing the catalog for frequently-used words and, for each word, storing the best token. The list can be limited to a specific number of entries, for example, the 100 words that occur most frequently, or the set of all words that occur a certain number of times (e.g., based on the total number of words in the catalog).

It should be noted that the preparation phase 202 can be performed when data is initially loaded into the catalog for the first time, or upon the first query submission if the cache is empty.

At step 204 the system awaits a user search query. While the query should be a text-based query, no specific format for the query is required. For example, in one embodiment, the query is in a Structured Query Language (SQL) format. The query may be submitted on the same machine where the cache and/or catalog are held, or on the same internal network, or from a remote location for an external network such as the Internet. Preliminarily, if the cache has been restricted to a specific character set as described above, then the query is pre-processed to remove characters that are not within the utilized set. If no query is received at step 204, then the method continues to await a query. If a query is received, then the method continues to step 206.

At step 206, the system enters a pre-search phase. In one embodiment, as will be described below, the cache may store search results for recent queries. The cache may store a certain number of results, for example, results for the last 100 queries, or may store any number of results within a time limitation, for example, the results for all queries in the past seven days, or some combination thereof. The results may be stored as being associated with a full query string or associated with each word of the query string stored separately. As an initial step, the method may parse this list of stored queries and results to see if the present query is in the list. If so, the method may exit the step and proceed directly to the post-search 210 or, if there is no post-search activity to conduct, the method may return the stored result as described in more detail below.

In another embodiment, as described briefly above, the cache includes a list of common terms (i.e., words) in the catalog and a best search space associated with each term. Accordingly, before proceeding further, the method may first check the list of common words to determine if any of the words of the query appear in that list. If so, the method will select the stored best search space associated with that term and proceed to the search phase 208. Otherwise, the method will determine a best search space as described below.

If no search result or best search space has been determined, the user query is parsed and broken into tokens of size N. Each token of the query is then compared against the token matrix. If the token matrix includes no entry (or zero frequency) for a given token, this is an indication that the text in the query does not exist in the catalog. Accordingly, at this point the search may terminate and proceed directly to the post-search 210 or, if there is no post-search activity to conduct, the method may return the result that there were no hits.

In one embodiment, if non-zero frequency entries appear for all tokens in the query, then the frequency component of each token is compared to select the token having the smallest frequency value in the token matrix. In other words, the search space with smallest number of corresponding items is selected. For example, in the exemplary token matrix 102 of the embodiment of FIG. 3, the bigram "AA" has a frequency of 232, the bigram "CA" has a frequency of 6,534, and the bigram "A9" has a frequency of 102. Accordingly, the catalog includes 232 items having the token "AA," 6,534 items having the token "CA" and 102 items having the token "A9." Thus, if a user submitted a query string of "CAA9," the method would select the search space of all items having the token "A9," as it is the smallest of the search spaces, having only 102 items. The method would then proceed to the search phase 208 using the search space for "A9."

In another embodiment, as each token is parsed, its corresponding frequency component in the cache is analyzed to determine if it is lower than a preset threshold. If the frequency for that token is lower than the preset threshold, then the method will stop parsing the query string and proceed directly to the search phase 208 using the search space associated with that token. The threshold may be a hard-coded number, for example, all tokens with a frequency less than 250. The threshold may also be a function of all frequencies in the token matrix, such as a percentile of all frequencies, for example, any frequency in the bottom ten percent of all non-zero frequencies. This embodiment has the benefit of not requiring a full parsing and cache lookup for every token in the query. While this embodiment may not always select the optimal search space, it will always select an acceptable one and will reduce the time of the parsing phase.

For example, again using the exemplary token matrix 102 of the embodiment of FIG. 3, and this time assuming a preset frequency threshold of lower than 250 hits, if a user submitted a query string of "CAA9," the method would stop after parsing the token "AA" because the associated frequency, 232, is less than the preset threshold of 250. The method would then proceed to the search phase 208 using the search space for "AA."

In one embodiment, the optimal search space is further determined by computing the conditional probability that a given token appears adjacent to the previous (left) token in the query string. The conditional probability can be quickly calculated using the multiplication rule with token frequencies in the token matrix as inputs. The conditional probability value, alone or in conjunction with the frequency, can then be compared to a pre-set threshold value as described above to further determine whether the token provides a favorable search space without parsing the entire query string. In some embodiments, conditional probability may be used only if the query string exceeds a certain length, in which case parsing the entire string would be a more time intensive process.

In exemplary embodiments, under the Multiplication Rule, a conditional probably P of a first token A being followed by a second token B is defined as $P(A \text{ and } B)=P(A)*P(B|A)$. Thus, if $f_A$ is the frequency of the first token A, and $n_t$ is the total number of tokens in the catalog, the probability $P(A)$ of the first token appearing in the catalog is $f_A/n_t$. For the probability $P(B|A)$ that token B appears given token A first, it will always be true that the first character of token B is last character of token A, because the tokens are adjacent. Accordingly, if the frequency of token B is $f_B$ and the total number of tokens in the catalog starting with the last character in token A is $n_A$, the probability $P(B|A)=f_B/n_A$. Putting these pieces together, the probability $P(A \text{ and } B)$ that token A appears followed by token B in the catalog would be $(f_A*f_B)/(n_t*n_A)$. In some embodiments, it may be desirable to normalize each calculated conditional probability (to a value between 0 and 1) by dividing it by the worst possible conditional probability in the catalog.

An example of a such a conditional probability calculation can be seen using the exemplary catalog 300 of FIG. 5A. The catalog 300 includes nine distinct items that are (for simplification purposes) limited to items having only combinations of the five characters, 'A,' 'I,' 'N;' 'S,' and 'T.' Accordingly, there are 25 possible bigram tokens. An exemplary token matrix 302 with token frequency values corresponding to the catalog 300 is seen in FIG. 5B.

For purposes of this example, an arbitrary threshold value of 20% is selected, meaning that the search will stop and select the present token as an optimal search space if the normalized conditional probability is less than 20%. As a first step, the worst (i.e., most likely) possible conditional probability may be selected by computing the set of all conditional probabilities for consecutive bigrams in the catalog. In the case of token matrix 302, the worst (i.e., most likely) three-letter combination is "STA." The conditional probability of "ST" being followed by "TA" can be calculated as $P(\text{``ST''} \text{ and } \text{``TA''})=(f_{ST}*f_{TA})/(n_t*n_T)=(5*5)/(25*5)=0.2$.

Given an exemplary search string, for example, the input string "insist in instant stats," the system will begin by parsing each pair of consecutive tokens, computing the normalized conditional probability for each, and determining whether the token presents an optimal search space. In this example, the first pair of tokens is "IN" and "NS." The conditional probability of "IN" being followed by "NS" can be calculated as $P(\text{``IN''} \text{ and } \text{``NS''})=(f_{IN}*f_{NS})/(n_t*n_N)=(7*2)/(25*5)=0.112$. The normalized conditional probability will be $0.112/0.2=0.56$. The calculated normalized conditional probability 0.56 is not below the selected threshold of 20% (0.2), and thus the system moves to the next token pair, "NS" and "SI." The conditional probability of "NS" being followed by "SI" can be calculated as $P(\text{``NS''} \text{ and } \text{``SI''})=(f_{NS}*f_{SI})/(n_t*n_S)=(2*2)/(25*5)=0.032$. The normalized conditional probability will be $0.032/0.2=0.16$. This calculated normalized conditional probability 0.16 is below the selected threshold of 20% (0.2), and thus the system will stop parsing the input string and select "NS" as the desired search space. Looking to FIG. 5A, this will limit the search to the items "INSTANT" and "INSIST," which are the only items in the "NS" search space, i.e., the only items that include the token "NS."

At step 208, the catalog is searched for the text submitted in the query. The search will be limited to the search space determined in the pre-search 206. Thus, using the exemplary embodiment of FIG. 3 again as an example, if it is determined that the best search space is the set of items having the token "A9," then the search can be restricted to items in the catalog having or associated with the key that corresponds to "A9" in the cache. It is contemplated that one or more alternative search algorithms may be utilized to find hits within the limited search space, for example, but not limited to, the Boyer-Moore algorithm.

In the post-search phase 210, the search results may be analyzed and stored for future use. It should be noted that the post-search phase 210 and the return of the search result 212 may occur simultaneously or in reverse order. For example, if a certain process of the post search phase 210 may be time or resource intensive, it may be advantageous to return the search result first so as to enhance the user experience.

The post-search 210 phase may include any number of processes, some of which were mentioned briefly above. For example, the method may store the query and the result(s) in the cache so that a future submission of the same query can quickly return the same result.

At step 212, the result is returned to the user that submitted the query. The result can take many different forms. For example, the result may be a data set, a pointer to a data set, or a set of pointers to data. The result may be presented in a report or on a display as part of a software application using, for example, an Application Programming Interface (API). The results presentation may include options to allow the user to further refine the query or to take other actions relating to the query such as adding or deleting items from the catalog.

While the method above describes processes for handling a query submitted to the catalog, it is also contemplated that the cache is a warm cache, i.e., is updated as the catalog is updated. Accordingly, the token frequency values may be updated as new items are add to the catalog or as items are deleted from the catalog. For example, for each new item that is added to the catalog (after the cache has been established in the preparation phase 202), the new item is parsed and the token frequency in the token matrix is incremented for each corresponding token. Similarly, when an item is deleted from the catalog, the deleted item may be parsed and the token frequency in the token matrix decremented for each corresponding token. If the cache includes storage of frequently occurring words and an associated best search space for each, the cache may rebuild this list after any item is added or deleted from the catalog, or rebuild every time a certain number of items have been added to or deleted from the catalog, or rebuild on a time-based rolling basis, for example, once per week.

In one exemplary embodiment, the search system 10 and method 200 are used to search an online product procurement system, such as that described in the '611 Application. As depicted in FIG. 12 of the '611 Application, the memory of the system includes several databases, including a purchase activity database, a price agreement database, a substitute product database, and a marketplace database. The memory further includes several logics, including user I/O logic, search relevance score logic, price optimization threshold distance logic, and savings influenced relevance score logic. The memory also includes user query data.

FIG. 11 of the '611 Application depicts an exemplary user query to and output from the inventive query processing engine disclosed therein. In one embodiment, the present system and method are used instead of or in conjunction with the query processing engine of the '611 Application. For example, the user query of FIG. 11 of the '611 Application may be the query submitted at step 204 of the present Application. The query may be for a text string representing a unique product identifier, product description(s), product attributes, unit of measure, manufacturer name, manufacturer part number, UPC number, Global Trade Identifier [GTIN], United Nations Standard Products and Services Code [UNSPSC], or the like. The '611 Application discusses the use of "a fuzzy logic algorithm" to find matches in the database. Instead, the present system and method could be used to parse the query string into tokens, determine the best search space based on token frequency values in the cache, and then search only the relevant search space. Thereafter, the methods described in the 611 Application may be utilized to provide a relevance score for each matching result based on certain identified data attributes. Finally, the search result at step 212 of the present Application may be the search result shown in FIG. 11 of the '611 Application and may rank and display the results according to the relevance score of each result as described therein.

The scope of the general inventive concepts are not intended to be limited to the particular exemplary embodiments shown and described herein. From the disclosure given, those skilled in the art will not only understand the general inventive concepts and their attendant advantages, but will also find apparent various changes and modifications to the methods and systems disclosed. It is sought, therefore, to cover all such changes and modifications as fall within the spirit and scope of the general inventive concepts, as described and claimed herein, and any equivalents thereof.

What is claimed is:

1. A computer-implemented method of searching a catalog of textual items, comprising:
   parsing each textual item of the catalog to determine a set of tokens, wherein a token is a consecutive set of characters having a predetermined length;
   storing the each of the tokens in a memory cache;
   for each token, storing a frequency value indicative of the frequency with which that token appears in the catalog;
   receiving a textual search query;
   parsing the textual query into tokens;
   selecting an optimal search token from the textual query based on the frequency value of that token in the memory cache, wherein the optimal search token comprises a first-parsed token of the textual query having a frequency value in the memory cache that is below a predetermined threshold,
   searching a subset of the catalog for contents of the textual search query, wherein the subset of the catalog is a set of items that include the optimal search token; and
   providing a result of the search.

2. The method of claim 1, wherein the predetermined length is two characters.

3. The method of claim 1, wherein the predetermined length is three characters.

4. The method of claim 1, further comprising:
   storing in the memory cache a list of words that commonly appear in the catalog;
   storing, for each word, an associated optimal search token;
   parsing the textual query to determine if any word of the query is stored in the list of words and, if so, searching a subset of the catalog for contents of the textual search query, wherein the subset of the catalog is a set of items that include the optimal search token associated with the word of the query.

5. The method of claim 1, further comprising:
   storing the textual search query as a first textual search query in the memory cache;
   storing the result of the first textual search query search in the memory cache;
   receiving a second textual search query; and
   determining if the second textual search query matches the first textual search query and, if so, returning the result of the first textual search query.

6. The method of claim 1, wherein the memory cache further includes a list of words that frequently appear in the catalog and an optimal search token for each word of the list.

7. The method of claim 6, wherein the memory cache further includes a list of prior textual search queries and a search result associated with each prior textual search query of the list.

8. The method of claim 1, wherein the memory cache further includes a list of prior textual search queries and a search result associated with each prior textual search query of the list.

9. A system for searching a catalog of data items stored on a non-transitory computer readable medium, wherein the data items each comprise a set of text characters divisible into a plurality of tokens, each token being a set of consecutive characters of a predetermined length within the data item, the system comprising:
   a memory cache having a matrix storing each of the plurality of tokens of the catalog and a frequency value indicative of the frequency with which each token appears in the catalog,
   wherein searches of the catalog are limited to a subset of the data items comprising data items having a token of a textual search query with a frequency value below a predetermined threshold.

10. The system of claim 9, wherein the predetermined length is three characters.

11. The system of claim 9, wherein the predetermined length is two characters.

12. The system of claim 9, wherein the memory cache further includes a list of words that frequently appear in catalog and an optimal search token for each word of the list.

13. The system of claim 9, wherein the memory cache further includes a list of prior textual search queries and a search result associated with each prior textual search query of the list.

14. The system of claim 9, wherein the memory cache further includes a list of words that frequently appear in the catalog and an optimal search token for each word of the list.

15. The system of claim 14, wherein the memory cache further includes a list of prior textual search queries and a search result associated with each prior textual search query of the list.

16. The system of claim 9, wherein the memory cache further includes a list of prior textual search queries and a search result associated with each prior textual search query of the list.

17. A method of searching a catalog of textual items for an item provided by a search query, the method comprising:
   dividing the catalog into a plurality of search spaces, wherein each search space corresponds to the set of all items in the catalog containing a specific token;
   selecting a search space based on a frequency with which a token of item provided by the search query appears in items of the catalog, wherein the token comprises the first token in the item provided by the search query having a frequency lower than a predetermined threshold; and
   searching the selected search space for the item provided by the search query.

18. The method of claim 17, wherein a token is a consecutive set of characters having a predetermined length of three characters.

19. The method of claim 17, wherein a token is a consecutive set of characters having a predetermined length of two characters.

* * * * *

UNITED STATES PATENT AND TRADEMARK OFFICE
CERTIFICATE OF CORRECTION

| | | |
|---|---|---|
| PATENT NO. | : 11,048,759 B1 | Page 1 of 1 |
| APPLICATION NO. | : 15/934019 | |
| DATED | : June 29, 2021 | |
| INVENTOR(S) | : Dermot Pope and Aaron Manuel | |

It is certified that error appears in the above-identified patent and that said Letters Patent is hereby corrected as shown below:

On the Title Page

Item (54) and in the Specification, Column 1, Line 1, "Title" - please delete the word "TOCHENIZED" and insert the word --TOKENIZED--

Signed and Sealed this
Eleventh Day of July, 2023

Katherine Kelly Vidal
*Director of the United States Patent and Trademark Office*